(12) United States Patent
Dowty

(10) Patent No.: US 6,742,842 B2
(45) Date of Patent: Jun. 1, 2004

(54) PASSENGER SEAT WITH PRIVACY SHELL

(75) Inventor: Mark Brian Dowty, Winston-Salem, NC (US)

(73) Assignee: B E Aerospace, Inc., Wellington, FL (US)

(*) Notice: Subject to any disclaimer, the term of this patent is extended or adjusted under 35 U.S.C. 154(b) by 0 days.

(21) Appl. No.: 10/189,614

(22) Filed: Jul. 3, 2002

(65) Prior Publication Data

US 2004/0004382 A1 Jan. 8, 2004

(51) Int. Cl.[7] .................................................. B60N 2/22
(52) U.S. Cl. ........................ 297/354.13; 297/184.14; 297/184.17
(58) Field of Search .................. 297/184.1, 184.11, 297/184.14, 184.15, 184.17, 354.1, 354.13

(56) References Cited

U.S. PATENT DOCUMENTS

| | | | |
|---|---|---|---|
| 5,092,653 A | * 3/1992 | Felling | 297/184.15 |
| 5,954,401 A | * 9/1999 | Koch et al. | 297/354.13 |
| D421,948 S | 3/2000 | Dryburgh et al. | |
| 6,059,364 A | 5/2000 | Dryburgh et al. | |
| 6,113,183 A | * 9/2000 | Koch et al. | 297/184.14 |
| 6,170,786 B1 | 1/2001 | Park et al. | |
| D439,063 S | 3/2001 | Round et al. | |
| 6,209,956 B1 | 4/2001 | Dryburgh et al. | |
| 6,305,644 B1 | 10/2001 | Beroth | |
| 6,352,309 B1 | * 3/2002 | Beroth | 297/354.13 |
| 6,412,870 B1 | * 7/2002 | Higgins et al. | 297/354.13 X |

FOREIGN PATENT DOCUMENTS

| | | |
|---|---|---|
| EP | 1162138 A2 | 12/2001 |
| FR | 2769286 A1 | 11/1998 |
| GB | 2295962 A | 6/1996 |
| GB | 2326824 A | 1/1999 |
| GB | 2331237 A | 5/1999 |
| WO | WO 00/21831 | 4/2000 |

\* cited by examiner

Primary Examiner—Anthony D. Barfield
(74) Attorney, Agent, or Firm—Adams Evans P.A.

(57) ABSTRACT

A passenger seat with privacy shell, including a seat base and seat bottom with a seat back carried by the seat base. A recline unit is provided for controlling movement of the seat back and locking the seat back in a desired recline position. An occupant-activated seat back recline control is provided for permitting movement of the seat back a desired position between an upright position and a recline position. A privacy shell is positioned on opposing lateral sides of the seat back and mounted for movement between a retracted position wherein the shell permits unimpeded lateral vision by the passenger seated in the seat, and a deployed position wherein the shell impedes lateral observation of the passenger seated in the seat, thereby providing privacy when desired by the passenger.

23 Claims, 7 Drawing Sheets

PASSENGER SEAT WITH PRIVACY SHELL

TECHNICAL FIELD AND BACKGROUND OF THE INVENTION

This invention relates to a passenger seat with a privacy shell. The seat has particular application in aircraft seats such as in long haul, first class seating units which provide sufficient room between seat rows to permit the seat to recline into a substantially flat surface satisfactory for sleeping. In many situations a passenger may desire more privacy than is normally possible in the confined area of the passenger cabin. Unless the passenger is fortunate enough to be seated next to an empty seat, he or she is essentially trapped a few inches from another passenger for long periods of time. Even in situations where the adjacent passengers are traveling together, there may be times when either or both would feel more comfortable if there were a partition to screen the person from direct visual contact with the adjacent passenger.

In addition, a common problem experienced with "lie flat" premium seating is that the person sitting aft of a fully reclined passenger is looking down at the top of the reclined passenger's head. Particularly when the aft-seated passenger stands up to leave the seat, he or she is looking almost straight down on the reclined passenger, and this is often perceived as a significant intrusion on the reclined passenger's privacy and comfort.

Some first class passenger seats include head rests having a concave head rest surface. The outer extensions forming the concavity provide some lateral screening, but may actually impede lateral vision or conversation. In most cases, partition walls, screens and similar physical barriers are impractical because of weight and safety considerations. There remains, therefore, a need for a practical means of permitting passengers to selectively determine the degree of privacy desired, and easily and quickly make adjustments to the seat to achieve the desired degree of privacy.

SUMMARY OF THE INVENTION

Therefore, it is an object of the invention to provide a aircraft passenger seat which provides a selective degree of visual privacy for an occupant.

It is another object of the invention to provide a aircraft passenger seat which permits a passenger seat occupant to automatically deploy a visual privacy shell as the seat is reclined and retract the privacy shell as the seat is moved to the upright position.

It is another object of the invention to provide an aircraft passenger seat which permits a passenger seat occupant to deploy a visual privacy shell progressively as the seat is reclined and retract the privacy shell progressively as the seat is moved to the upright position.

It is another object of the invention to provide an aircraft passenger seat which provides lateral screening for a passenger as the seat is reclined.

It is another object of the invention to provide an aircraft passenger seat which provides aft screening from an aft-seated passenger when the seat is reclined.

These and other objects of the present invention are achieved in the preferred embodiments disclosed below by providing a passenger seat with privacy shell, and comprising a seat bottom chassis including a plurality of leg modules and section assembly modules, a plurality of beam elements carrying said leg modules and section assembly modules in spaced-apart relation to each other to define a ladder frame assembly, and a seat back unit, including a headrest, pivotally-mounted between two of the section assembly modules for permitting the angle of the seat back relative to the seat bottom chassis to be varied. A recline unit is provided for controlling movement of the seat back and locking the seat back in a desired recline position. An occupant-activated seat back recline control is provided for permitting movement of the seat back to a desired position between an upright position and a recline position. A privacy shell is positioned on opposing lateral sides of the seat back unit and mounted for movement between a retracted position aft of a passenger support surface of the headrest wherein the shell permits unimpeded lateral vision by the passenger seated in the seat, and a deployed position forward of the passenger support surface of the headrest wherein the shell impedes lateral observation of the passenger seated in the seat, thereby providing privacy when desired by the passenger.

According to one preferred embodiment of the invention, the privacy shell is mounted for movement with the seat back wherein the privacy shell is in the retracted position when the seat back is in its upright position and is in the deployed position when the seat back is in the recline position.

According to another preferred embodiment of the invention, the privacy shell is mounted for progressive movement in coordination with the movement of the seat back.

According to yet another preferred embodiment of the invention, the seat back is mounted for pivotal movement about a first pivot, and the privacy shell is mounted for pivotal movement about a second pivot non-concentric with the first pivot.

According to yet another preferred embodiment of the invention, the seat back is mounted for pivotal movement about a first pivot, and the privacy shell is mounted for pivotal movement about a second pivot non-concentric with the first pivot and at a rate of movement different that the rate of movement of the seat back about the first pivot.

According to yet another preferred embodiment of the invention, the seat back is mounted for pivotal movement about a first pivot, and the privacy shell is mounted for pivotal movement about a second pivot non-concentric with the first pivot and at the same rate of movement as the rate of movement of the seat back about the first pivot.

According to yet another preferred embodiment of the invention, the seat back and the privacy shell are concentrically mounted for pivotal movement about a first pivot.

According to yet another preferred embodiment of the invention, the seat back is mounted for pivotal movement about a first pivot at a first rate of movement, and wherein the privacy shell is concentrically mounted for movement about the first pivot at a second rate of movement different from the first rate of movement.

According to yet another preferred embodiment of the invention, an occupant-activated privacy shell control is provided for permitting movement of the privacy shell between the retracted and deployed positions independent of the upright or recline position of the seat back.

According to yet another preferred embodiment of the invention, load bearing slots are positioned on opposing inner walls of the privacy shell and cooperate with complementary rollers carried by the seat back and mounted in a respective one of said slots for supporting the privacy shell while stationary and during movement.

According to yet another preferred embodiment of the invention, the privacy shell includes an outer-facing hard shell and an inner-facing upholstered passenger interface surface.

According to yet another preferred embodiment of the invention, the occupant-activated seat back recline control is interfaced with the privacy shell wherein the seat back and privacy shell are moved in unison coordination between the upright and recline positions.

According to yet another preferred embodiment of the invention, the privacy shell moves progressively from the retracted position to the deployed privacy position during movement of the seat back from the upright to the recline position.

According to yet another preferred embodiment of the invention, the privacy shell moves progressively from the retracted position to the deployed privacy position during movement of the seat back from the upright to the recline position, and the seat back is moveable to intermediate positions between the upright and recline position with the privacy shell positioned in a privacy position intermediate the retracted and deployed positions.

An embodiment of the method of permitting a passenger in an aircraft passenger seat to vary the degree of privacy accorded the passenger by the seat according to the invention comprises the steps of providing a seat bottom chassis including a plurality of leg modules and section assembly modules, a plurality of beam elements carrying said leg modules and section assembly modules in spaced-apart relation to each other to define a ladder frame assembly, and a seat back unit, including a headrest, pivotally-mounted between two of the section assembly modules for permitting the angle of the seat back relative to the seat bottom chassis to be varied. A recline unit is provided for controlling movement of the seat back and locking the seat back in a desired recline position, and comprising an occupant-activated seat back recline control for permitting movement of the seat back to a desired position between an upright position and a recline position. A privacy shell is positioned on opposing lateral sides of the seat back unit. The method further includes the steps of moving the privacy shell to a retracted position aft of a passenger support surface of the headrest wherein the shell permits unimpeded lateral vision by the passenger seated in the seat, and moving the privacy shell to a deployed position forward of the passenger support surface of the headrest wherein the shell impedes lateral observation of the passenger seated in the seat, thereby providing privacy when desired by the passenger.

According to one preferred embodiment of the invention, the method includes the step of moving the privacy shell in coordination with the seat back wherein the privacy shell is in the retracted position when the seat back is in its upright position and is in the deployed position when the seat back is in the recline position.

According to another preferred embodiment of the invention, the method includes the step of moving the privacy shell in coordination with the movement of the seat back.

According to yet another preferred embodiment of the invention, the method includes the steps of mounting the seat back for pivotal movement about a first pivot, and mounting the privacy shell for pivotal movement about a second pivot non-concentric with the first pivot.

According to yet another preferred embodiment of the invention, the method includes the steps of mounting the seat back for pivotal movement about a first pivot, and mounting the privacy shell for pivotal movement about a second pivot non-concentric with the first pivot and at a rate of movement different that the rate of movement of the seat back about the first pivot.

According to yet another preferred embodiment of the invention, the method includes the steps of mounting the seat back for pivotal movement about a first pivot, and mounting the privacy shell for pivotal movement about a second pivot non-concentric with the first pivot and at the same rate of movement as the rate of movement of the seat back about the first pivot.

According to yet another preferred embodiment of the invention, the method includes the step of mounting the seat back and the privacy shell for pivotal movement about a first pivot.

According to yet another preferred embodiment of the invention, the method includes the steps of mounting the seat back for pivotal movement about a first pivot at a first rate of movement, and mounting the privacy shell concentrically for movement about the first pivot at a second rate of movement different from the first rate of movement.

According to yet another preferred embodiment of the invention, the method includes the step of controlling the movement of the privacy shell between the retracted and deployed positions independent of the upright or recline position of the seat back by means of an occupant-activated control.

According to yet another preferred embodiment of the invention, the method includes the step of supporting the privacy shell relative to the seat back by load bearing slots positioned on opposing inner walls of the privacy shell and cooperating with complementary rollers carried by the seat back and mounted in a respective one of said slots.

According to yet another preferred embodiment of the invention, the method includes the steps of providing the privacy shell with an outer-facing hard shell and an inner-facing upholstered passenger interface surface.

According to yet another preferred embodiment of the invention, the method includes the steps of interfacing the occupant-activated seat back recline control with the privacy shell wherein the seat back and privacy shell are moved in unison coordination to and between the upright and recline positions.

According to yet another preferred embodiment of the invention, the method includes the step of moving the privacy shell progressively from the retracted position to the deployed privacy position during movement of the seat back from the upright to the recline position.

According to yet another preferred embodiment of the invention, the method includes the steps of moving the privacy shell progressively from the retracted position to the deployed privacy position during movement of the seat back from the upright to the recline position.

According to yet another preferred embodiment of the invention, the method includes the step of moving the seat back to intermediate positions between the upright and recline position with the privacy shell positioned in a privacy position intermediate the retracted and deployed positions.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
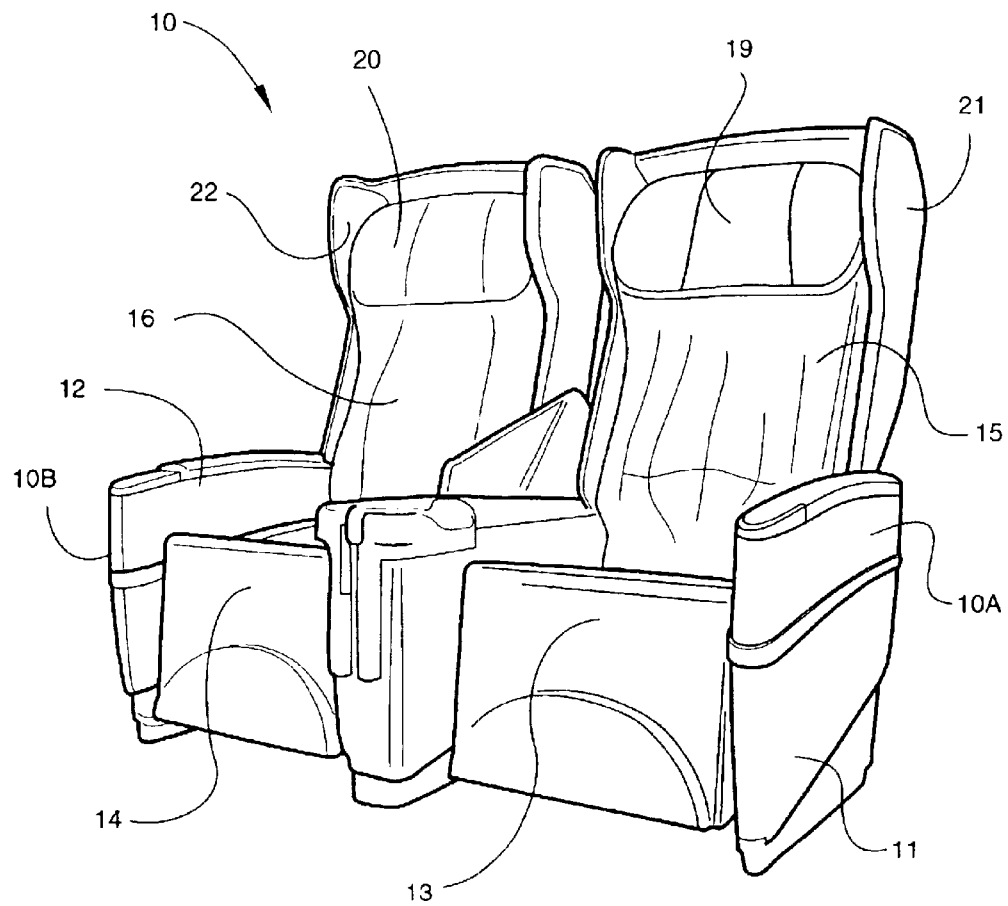
FIG. 1 is a perspective view of a two passenger seat set with privacy shells according to an embodiment of the invention.

Referring now specifically to the drawings, a passenger seat set of two adjacent seats, each with a privacy shell according to one embodiment of the present invention, is illustrated in FIG. 1 and shown generally at reference numeral 10. Attachment of the seat set 10 to the deck of the aircraft is made by use of track fittings, such as those disclosed in applicant's U.S. Pat. No. 5,169,091, 5,178,346 or 5,861,318. The seat set 10 includes two adjacent passenger seats 10A, 10B as would typically be found in the first class or business cabin of a passenger aircraft. Seats 10A and 10B have respective end bays 11 and 12, seat bottoms 13 and 14, seat backs 15 and 16, head rests 19 and 20 and privacy shells 21 and 22. The privacy shells 21, 22 comprise relatively thin, lightweight composite structures that fit around the seat backs 15, 16 and head rests 19, 20, respectively, and provide a variable degree of privacy to the passengers, based upon the position of the seat backs 15,16.

Figure 2:
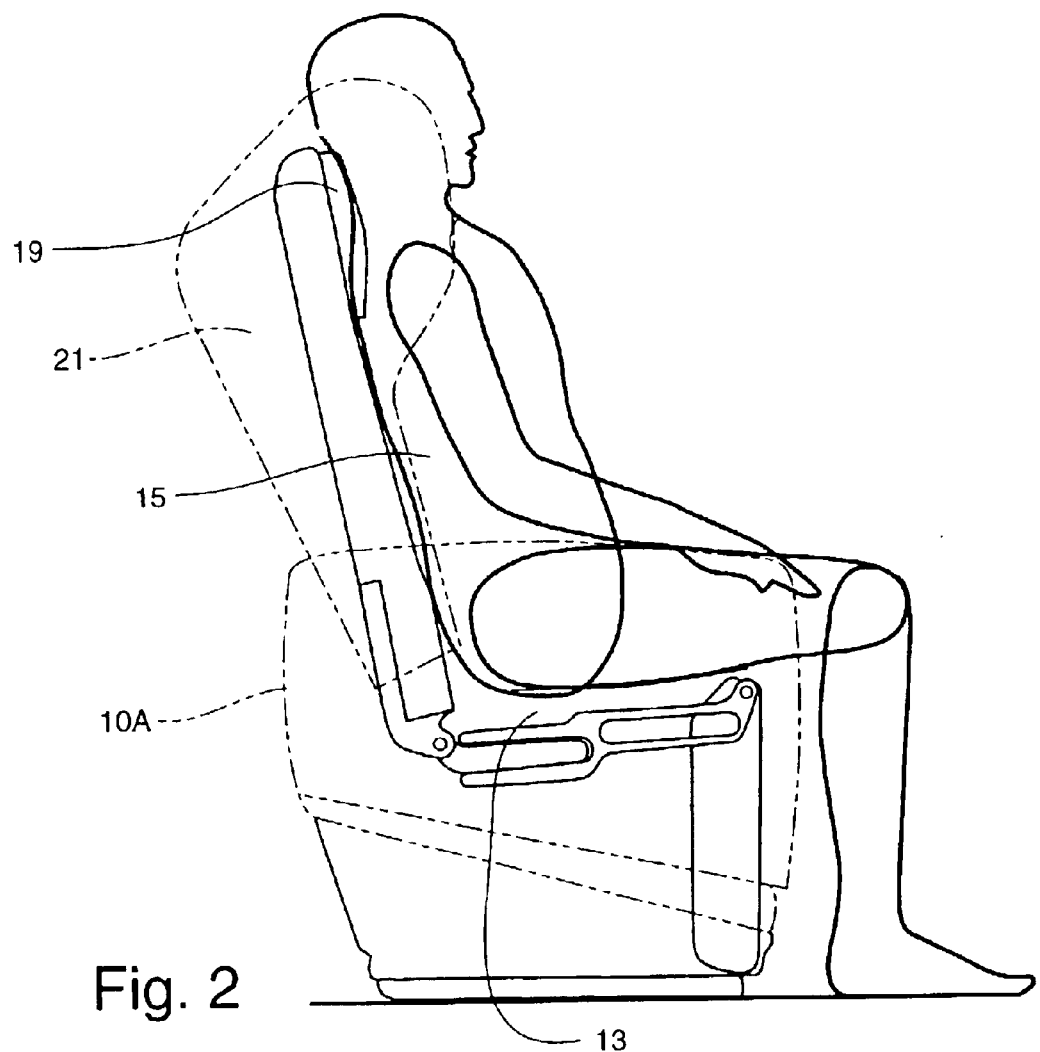
FIG. 2 is a wire frame side elevation of the seat shown in FIG. 1 showing orientation of the privacy shell in relation to the passenger and the seat back in the upright position.

With specific reference now to the seat 10A, as seat back 15 is reclined from the upright position shown in FIGS. 1 and 2, the privacy shell 21 reclines at a slower rate relative to recline of the seat back 15, in effect deploying into positions providing progressively greater degrees of privacy to the seat occupant. This causes the seat back 15 to retract aft and downwardly into the privacy shell 21 so that the lateral sides of the privacy shell 21 shield more of the head of the passenger from lateral viewing and from aft viewing and perceived proximity with reference to an aft-seated passenger.

Figure 3:
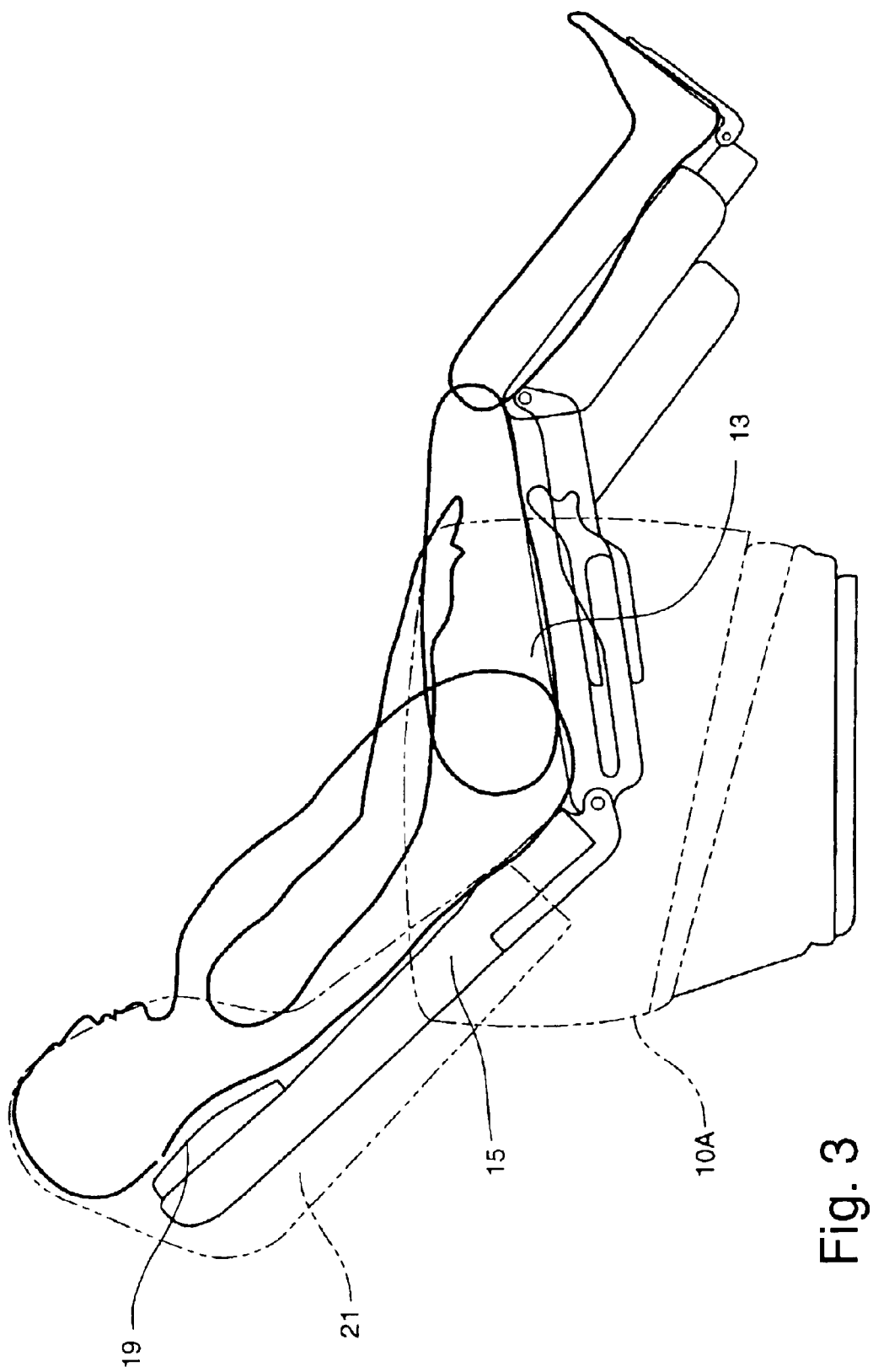
FIG. 3 is a wire frame side elevation of the seat shown in FIG. 1 showing orientation of the privacy shell in relation to the passenger and the seat back in an intermediate position between full recline and full upright positions.
Figure 4:
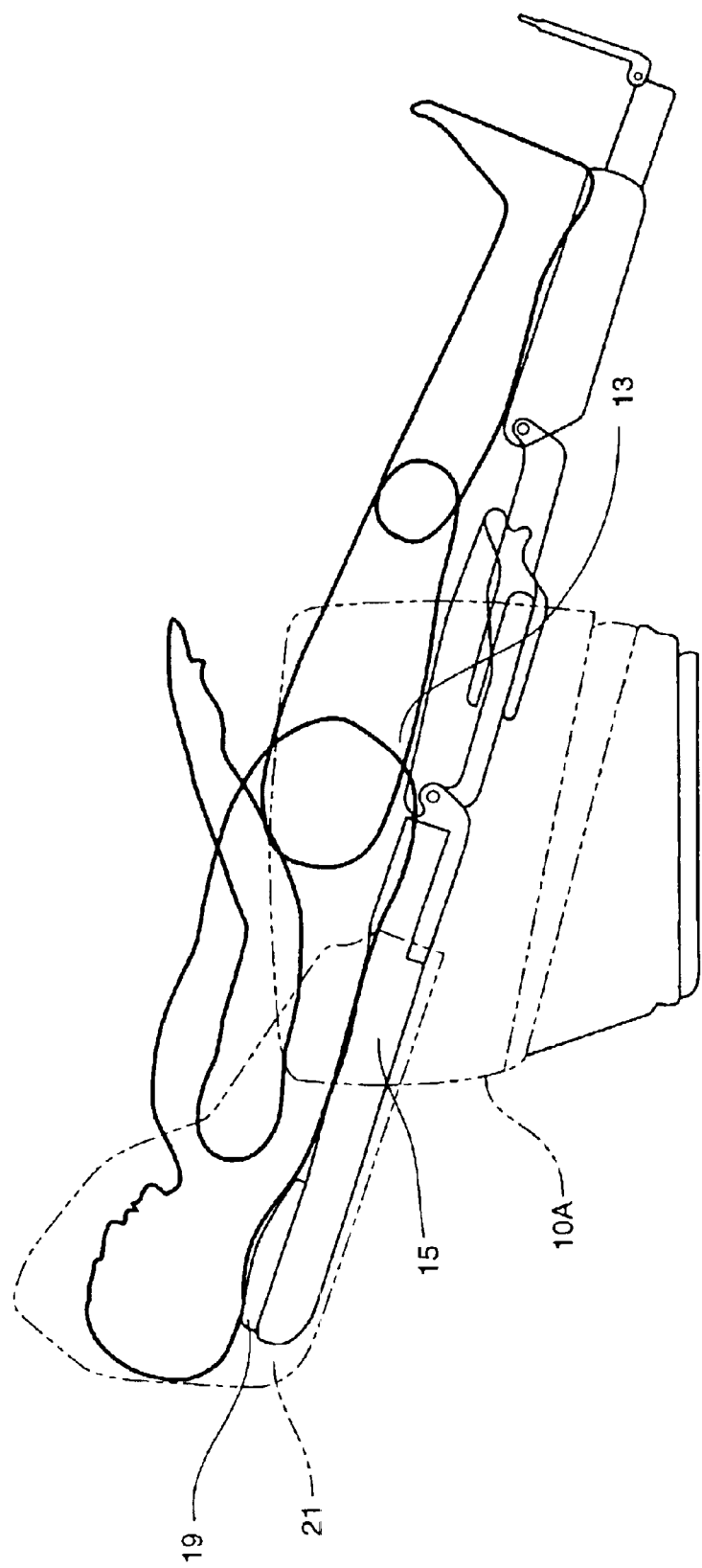
FIG. 4 is a wire frame side elevation of the seat shown in FIG. 1 showing orientation of the privacy shell in relation to the passenger and the seat back in the recline position.

In FIGS. 3 and 4, seat 10B is shown in the intermediate and fully-reclined positions. To illustrate the effect of altering the position of the privacy shell 22 relative to the seat back 16, standard human figure representations are shown. In the upright position shown in FIG. 2 the seat back 15 is positioned relatively forward in the privacy shell 21, exposing the head of the passenger and allowing lateral visual contact. This is the position where the passenger will be most likely be communicating with a seatmate, interacting with flight attendants or otherwise requiring lateral eye contact.

FIG. 3 presents an intermediate recline position where the passenger may be awake but resting, reading or watching a movie. The seat back 15 and head rest 19 are retracted into the privacy shell 21 whereby the face of the passenger is screened from lateral vision. In this position the passenger may desire some privacy but also needs the ability to easily establish eye contact with a seatmate by raising the head slightly and looking to the side.

FIG. 4 shows the seat 10A in a fully-reclined position where the passenger will most likely be asleep or at least desiring rest and privacy. Note here that the seat back 15 and head rest 19 are fully retracted into the privacy shell 21 so that the passenger's head is substantially below the front profile of the privacy shell 21. In this position the passenger enjoys a maximum degree of privacy from the side, but is still visible from an oblique front angle.

The seat back 15 and head rest 19 move in unison and are activated by a conventional seat back recline mechanism powered by an electric motor operated by the passenger by means of a control button (not shown) on the seat 10A. As explained and illustrated in further detail below, the seat back 15 is moved by the electric motor, and the privacy shell 21 is mounted for a differential rate of movement relative to the seat back 15. In effect, the seat back 15 is the "master" and the privacy shell 21 is the "slave" in that the privacy shell 21 is supported by the seat back 15.

Alternatively, the seat back may be moved by mechanical means, such as springs, hydraulic or pneumatic cylinder assemblies controlled by the passenger.

Figure 5:
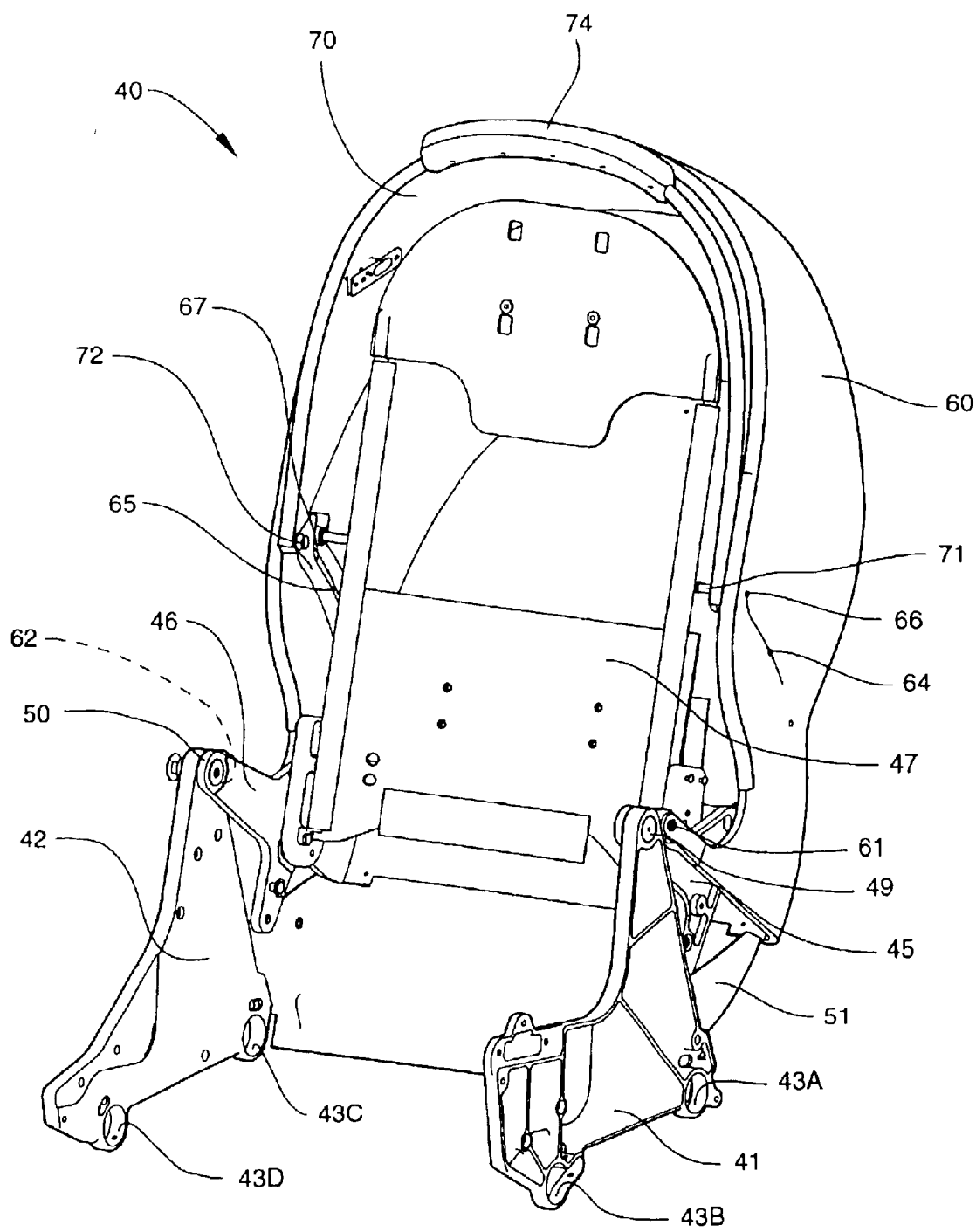
FIG. 5 is a partial perspective view of the seat back and privacy shell elements of a seat according to another embodiment of the invention, with parts removed for clarity.

Further details of the invention are illustrated with reference seat 40 shown in FIG. 5. The mechanical operation of seat 10A nd 40 are the same, but the appearance of the seats differs. FIG. 5 is a fragmentary view with parts, including the seat cushions, seat pan and the like removed for clarity. Seat 40 includes a pair of spreaders 41, 42 which are mounted onto laterally extending tubular beams (not shown) by mounting collars 43A, 43B, 43C and 43D. A pair of seat back pivot plates 45, 46 carry the seat back 47. The seat back 47 moves about a pair of seat back pivots 49, 50 by means of an electric motor (not shown) mounted behind the seat back 47 and covered by a shroud 51 which extends downwardly from the bottom of the seat back 47. The shroud 51 both protects the motor and screens it from the view of an aft-seated passenger.

A privacy shell 60 is mounted for pivotal movement about a pair of privacy shell pivots 61, 62 carried by the respective seat back pivot plates 45, 46. Note that the privacy shell pivots 61, 62 are positioned aft of the respective seat back pivots 49, 50 in essentially the same horizontal plane. This forms a non-concentric pivoting relationship between the seat back 47 and the privacy shell 60. The privacy shell is attached to the seat back 47 by means of a pair of guide rollers 64, 65 which extend outwardly from opposing sides of the seat back 47 and are captured in and slide along respective curved slots 66, 67. The angle and degree of curvature of these slots 66, 67 in combination with the relative position of the pivots 61, 62 determine the degree of pivotal movement of the privacy shell 60 relative to the pivotal movement of the seat back 47. As is best illustrated by reference back to FIGS. 2, 3 and 4, this relative movement results in the seat back 47 reclining and lowering at a greater rate that the privacy shell 60 and elevating back to the upright position at the same greater rate. This differential movement has the effect of allowing the upper torso and head of the passenger to be screened to a progressively greater degree as the seat back 47 is reclined.

Figure 6:
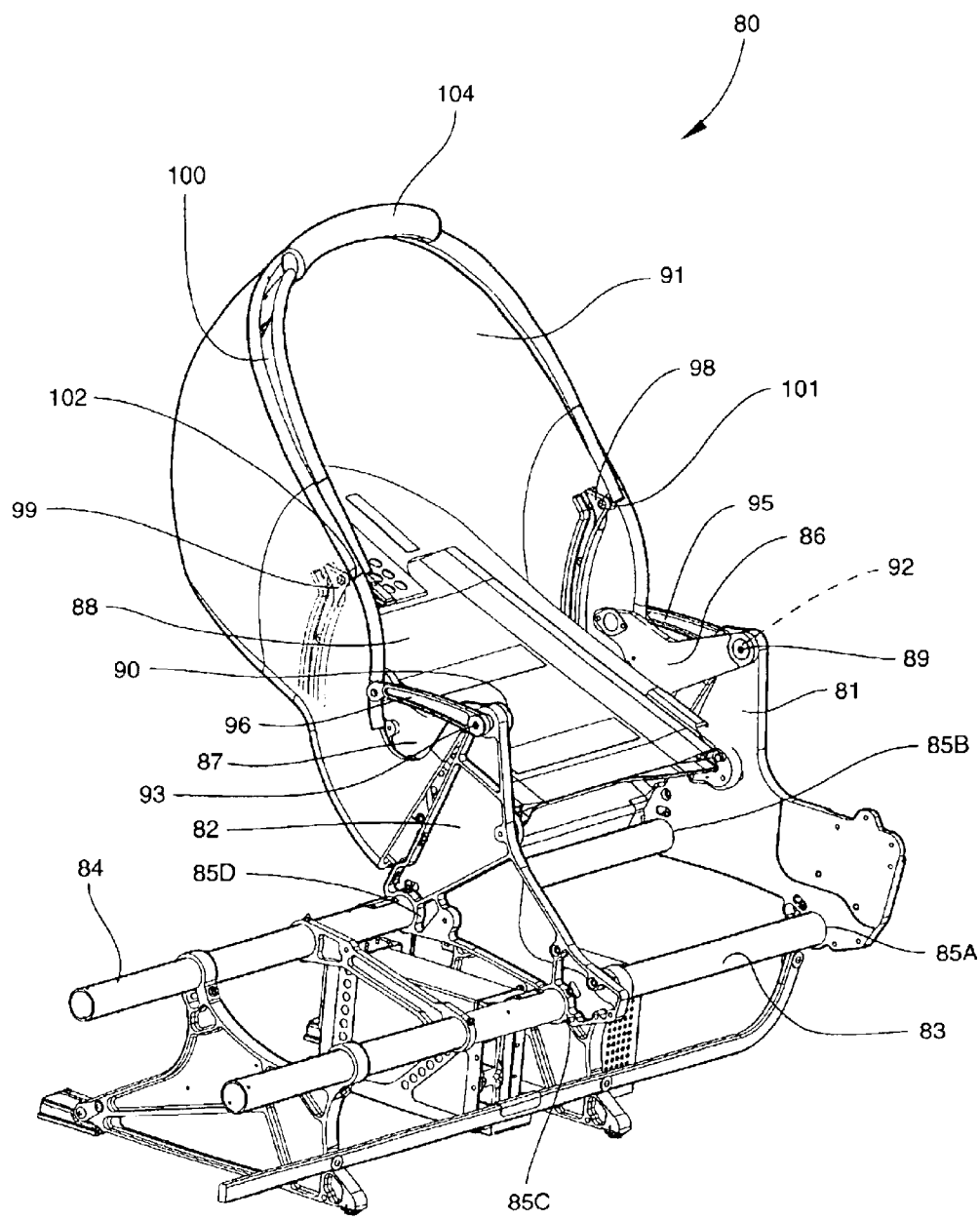
FIG. 6 is a partial perspective view of a seat back and privacy shell elements of a seat according yet another embodiment to the invention, with parts removed for clarity.
Figure 7:
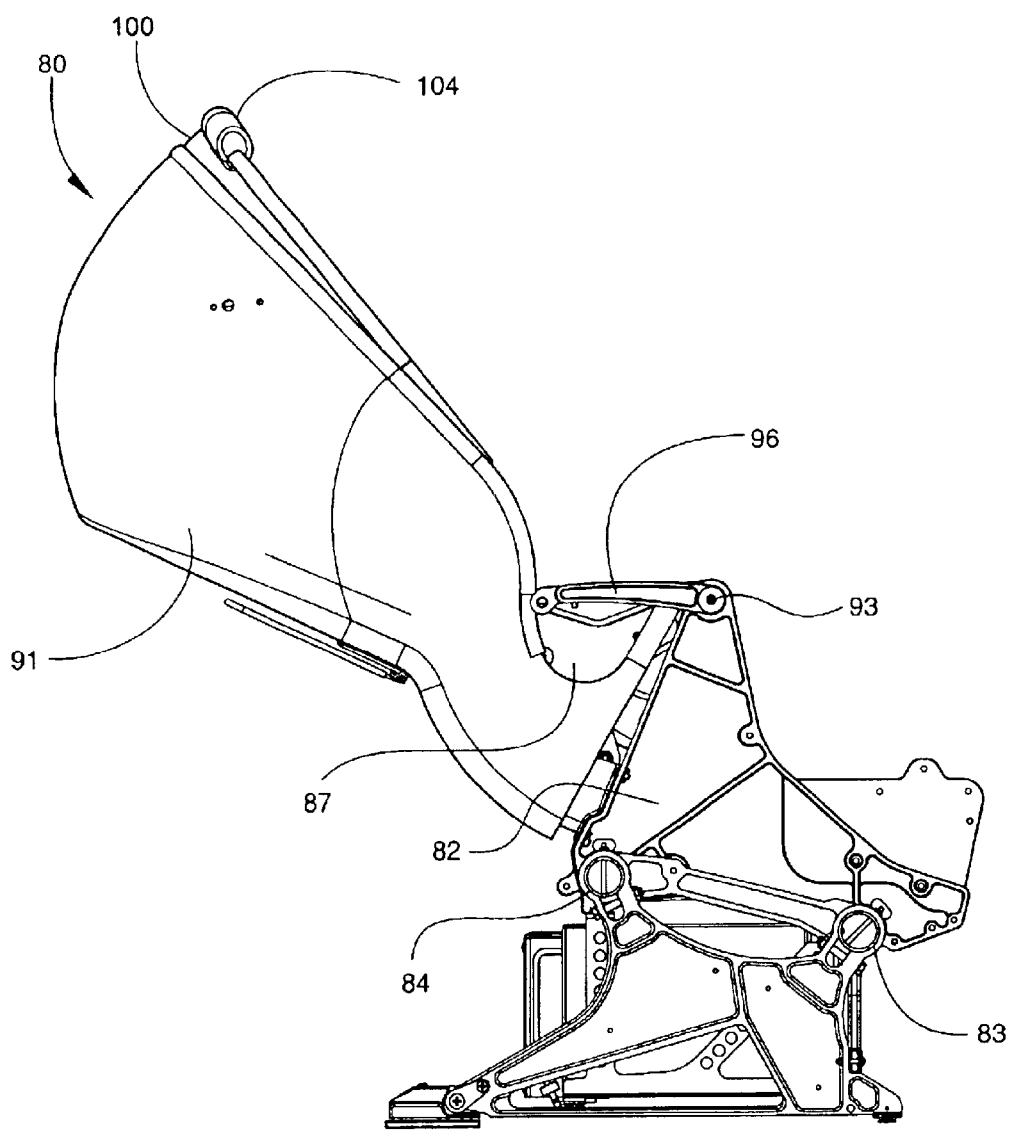
FIG. 7 is a side elevation of the seat shown in FIG. 6.

This relative movement can be achieved in a number of ways. In addition to the above-described structure wherein the privacy shell pivots about a point non-concentric with the seat back at the same rate, the same effect can be achieved by having the seat back and privacy shell concentrically-mounted but pivoting at a different rate. This structure is shown in FIGS. 6 and 7 with reference to seat 80.

Seat 80 includes a pair of spreaders 81, 82 which are mounted onto laterally extending tubular beams by mounting collars 85A, 85B, 85C and 85D. A pair of seat back pivot plates 86, 87 carry the seat back 88. The seat back 88 moves about a pair of seat back pivots 89, 90 by means of an electric motor (not shown) mounted behind the seat back 88.

A privacy shell 91 is mounted for pivotal movement about a pair of privacy shell pivots 92, 93 carried by the respective seat back pivot plates 86, 87. A pair of connecting bars 95, 96 connect the pivots 92, 93 with the privacy shell 91. Note that the privacy shell pivots 92, 93 are concentric with the seat back pivots 89, 90. This forms a concentric pivoting relationship between the seat back 88 and the privacy shell 91.

The privacy shell 91 is attached to the seat back 88 by means of a pair of guide rollers (not shown) which extend outwardly from opposing sides of the seat back 88 and are captured in and slide along respective curved slots 98, 99. The angle and degree of curvature of these slots 98, 99 determine the degree of pivotal movement of the privacy shell 91 relative to the pivotal movement of the seat back 88. This relative movement about concentric pivots results in the seat back 88 reclining at a greater rate that the privacy shell 91 and elevating back to the upright position at the same greater rate. This differential movement has the effect of allowing the upper torso and head of the passenger to be screened to a progressively greater degree as the seat back 88 is reclined.

Additional privacy and reduced lighting level may be achieved by lowering the hood 100. Hood 100 is nested within the privacy shell 91 and pivots between a normally retracted position, shown in FIGS. 6 and 7, and an extended position (not shown) where the hood 100 is pivoted forward on pivots 101, 102 by grasping the hand hold 104 and pulling the hood 100 outwardly and downwardly over the upper torso of the passenger. The hood 100 is retracted by grasping the hand hold 104 and pushing the hood 100 upwardly until it hits the forward edge of the privacy shell. The hood 100 may also be positioned at any position intermediate the fully extended and fully retracted position.

Alternatively, the hood 100 may be provided with its own driving slots so that it automatically deploys from the privacy shell 91 when the seat back 88 reclines and retracts as the seat back 88 is raised to the upright position.

An additional advantage of the seat designs disclosed herein with movable privacy shells is that the moving shell permits significantly more space between fore and aft seats when the seats are in the full upright position. The passengers may move more comfortably to and from the seats, and during taxi, take-off and landing, this additional room between seats provides an extra margin of safety in the event of a need to quickly exit the seating rows.

A passenger seat with privacy shell is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A passenger seat with privacy shell, comprising:
    (a) a seat base;
    (b) a scat bottom carried by the seat base;
    (c) a seat back unit, including a headrest, pivotally-mounted on the seat base, wherein the seat back is mounted for pivotal movement about a first pivot at a first rate of movement;
    (d) a recline unit for controlling movement of the seat back and locking the seat back in a desired recline position, and comprising an occupant-activated seat back recline control for permitting movement of the seat back to a desired position to and between an upright position and a recline position;
    (e) a privacy shell positioned on opposing lateral sides of the scat back unit, wherein the privacy shell is concentrically mounted for movement about the first pivot at a second rate movement different from the first rate of movement, the privacy shell extending around the seat back unit and mounted for movement between:
        (i) a retracted position aft of a passenger support surface of the headrest wherein the shell permits unimpeded lateral vision by the passenger seated in the seat; and
        (ii) a deployed position forward of the passenger support surface of the headrest wherein the shell impedes lateral observation of the passenger seated in the seat, thereby providing privacy when desired by the passenger.

2. A passenger scat according to claim 1, wherein the privacy shell is mounted for movement with the seat back wherein the privacy shell is in the retracted position when the seat back is in its upright position and is in the deployed position when the seat back is in the recline position.

3. A passenger seat according to claim 1, wherein the privacy shell is mounted for progressive movement in coordination with the movement of the seat back.

4. A passenger seat according to claim 1, and including an occupant-activated privacy shall control for permitting movement of the privacy shell to and between the retracted end deployed positions independent of the upright or recline position or the seat back.

5. A passenger scat according to claim 1, and including load bearing slots positioned on opposing inner walls of the privacy shell and cooperating with complementary guide rollers carried by the seat back and mounted in a respective one of said slots rot supporting the privacy shell while stationary and during movement.

6. A passenger seat according to claim 1, wherein the privacy shell includes an outer-facing hard shell and an inner-facing upholstered passenger interface surface.

7. A passenger seat according to claim 1, wherein the privacy shell includes a hood pivotally-mounted thereon and movable between an extended position forward of the privacy shell and a retracted position nested within the privacy shell.

8. A passenger seat according to claim 1, wherein the privacy shell moves progressively from the retracted position to the deployed privacy position during movement of the seat back from the upright to the recline position.

9. A passenger seat according to claim 1, wherein the privacy shell moves progressively front the retracted position to the deployed privacy position during movement of the seat back from the upright to the recline position, and further wherein the seat back is moveable to intermediate positions to and between the upright and recline position with the privacy shell positioned in a privacy position intermediate the retracted and deployed positions.

10. A passenger seat with privacy shell, comprising:
    (a) a seat base;
    (b) a seat bottom carried by the seat base;
    (c) a seat back unit, including a headrest, pivotally-mounted on the seat base;
    (d) a recline unit for controlling movement of the seat back and locking the seat back in a desired recline position, and comprising an occupant-activated seat back recline control for permitting movement of the seat back to a desired position to and between an upright position and a recline position;

(e) a privacy shell positioned on opposing lateral sides of the seat back unit, extending around the seat back unit and mounted for movement between:
  (i) a retracted position aft of a passenger support surface of the head rest wherein the shell permits unimpeded lateral vision by the passenger seated in the seat;
  (ii) a deployed position forward or the passenger support surface of the headrest wherein the shell impedes lateral observation of the passenger seated in the seat, thereby providing privacy when desired by the passenger; and (f) an occupant-activated privacy shell control for permitting movement of the privacy shell to and between the retracted and deployed positions independent or the upright or recline position of the seat back.

11. A passenger seat with privacy shell, comprising:
(a) a seat base;
(b) a seat bottom carried by the seat base;
(c) a seat back unit, including a headrest, pivotally-mounted on the send base;
(d) a recline unit for controlling movement of the seat back and locking the seat back in a desired recline position, and comprising an occupant-activated seat back recline control for permitting movement of the seat back to a desired position to and between an upright position and a recline position;
(e) a privacy shell positioned on opposing lateral sides of the seat back unit, extending around the seat back unit and mounted for movement between:
  (i) a retracted position aft of a passenger support surface of the headrest wherein the shell permits unimpeded lateral vision by the passenger seated in the seat;
  (ii) a deployed position forward of the passenger support surface of the headrest wherein the shell impedes lateral observation of the passenger seated in the seat, thereby providing privacy when desired by the passenger; and
(f) load bearing slots positioned on opposing inner walls of the privacy shell and cooperating with complementary guide rollers carried by the seat back and mounted in a respective one of said slots tar supporting the privacy shell while stationary and during movement.

12. A passenger seat according to claim 10, wherein the seat back is mounted for pivotal movement about a first pivot, and the privacy shell is mounted for pivotal movement about a second pivot non-concentric with the first pivot.

13. A passenger seat according to claim 11, wherein the seat back is mounted for pivotal movement about a first pivot, and the privacy shell is mounted for pivotal movement about a second pivot non-concentric with the first pivot and at a rate of movement different that the rate of movement of the seat back about the first pivot.

14. A passenger seat according to claim wherein the seat back is mounted for pivotal movement about a first pivot, and the privacy shell is mounted for pivotal movement about a second pivot non-concentric with the first pivot and at the same rate of movement as the rate of movement of the seat back about the first pivot.

15. A method of permitting a passenger in an aircraft passenger seat to vary the degree of privacy accorded the passenger by the seat; comprising the steps or:

(a) providing:
  (i) a scat base:
  (ii) a seat bottom carried by the base;
  (iii) a seat back unit, including a headrest, pivotally-mounted on the seat base for permitting the angle of the seat back relative to the seat bottom to be varied;
  (iv) a recline unit for controlling movement of the seat back and locking the seat back in a desired recline position, and comprising an occupant-activated seat back recline control for permitting movement of the seat back to a desired position to and between an upright position and a recline position; and
  (v) a privacy shell positioned on opposing lateral sides of the seat back unit and extending around the seat back unit;
(b) moving the privacy shell to a retracted position aft of a passenger support surface of the headrest wherein the shell permits unimpeded lateral vision by the passenger seated in the seat; and
(c) moving the privacy shell to a deployed position forward of the passenger support surface of the headrest wherein the shell impedes lateral observation or the passenger seated in the seat, thereby providing privacy when desired by the passenger; and
(d) mounting the seat back for pivotal movement about a first pivot at a first rate of movement, and mounting shell concentrically for movement about the first pivot at a second rate of movement different from the first rate of movement.

16. A method according to claim 15, and including the step of moving the privacy shell in coordination with the seat back wherein the privacy shell is in the retracted position when the seat back is in its upright position and is in the deployed position when the seat back is in the recline position.

17. A method according to claim 15, and including the step of moving the privacy shell in coordination with the movement of the seat back.

18. A method according to claim 15, and including the step of controlling the movement of the privacy shell to and between the retracted and deployed positions independent of the upright or recline position of the seat back by means of an occupant-activated control.

19. A method according to claim 18, and including the step of supporting the privacy shell relative to the seat back by load bearing slots positioned on opposing inner walls of the privacy shell and cooperating with complementary rollers carried by the seat back and mounted in a respective one of said slots.

20. A method according to claim 15, and including the stops of providing the privacy shell with an outer-facing herd shell end an inner-facing upholstered passenger interface surface.

21. A method according to claim 15, and including the step of interfacing the occupant-activated seat back recline control with the privacy shell wherein the seat back and privacy shell are moved in unison coordination to and between the upright and recline positions.

22. A method according to claim 15, and including the steps of moving the privacy shell progressively from the retracted position to the deployed privacy position during movement of the seat back from the upright to the recline position.

23. A method according to claim 15, and including the step of moving the seat back to intermediate positions to and between the upright and recline position with the privacy shell positioned in a privacy position intermediate the retracted and deployed positions.

* * * * *

UNITED STATES PATENT AND TRADEMARK OFFICE
CERTIFICATE OF CORRECTION

PATENT NO. : 6,742,842 B2
DATED : June 1, 2004
INVENTOR(S) : Dowty

It is certified that error appears in the above-identified patent and that said Letters Patent is hereby corrected as shown below:

Column 8,
Line 10, delete "the scat" and enter -- the seat --
Line 12, after "a second rate" enter -- of --
Lines 24 and 36, delete "scat" and enter -- seat --
Line 32, delete "shall" and enter -- shell --
Line 40, delete "rot" and enter -- for --
Line 54, delete "front" and enter -- from --

Column 9,
Lines 12, 19 and 67, delete "or" and enter -- of --
Line 25, delete "send" and enter -- seat --
Line 59, after "claim" enter -- 11 --

Column 10,
Line 2, delete "scat" and enter -- seat --
Line 21, delete "or" and enter -- of --

Signed and Sealed this

First Day of February, 2005

JON W. DUDAS
*Director of the United States Patent and Trademark Office*